(12) United States Patent
Lebreton

(10) Patent No.: US 7,869,129 B2
(45) Date of Patent: Jan. 11, 2011

(54) RETRACTABLE DISPLAY DEVICE FOR A MOTOR VEHICLE AND A VEHICLE PROVIDED THEREWITH

(75) Inventor: Etienne Lebreton, Vanves (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 256 days.

(21) Appl. No.: 12/094,162

(22) PCT Filed: Nov. 15, 2006

(86) PCT No.: PCT/FR2006/051177

§ 371 (c)(1),
(2), (4) Date: May 19, 2008

(87) PCT Pub. No.: WO2007/057608

PCT Pub. Date: May 24, 2007

(65) Prior Publication Data

US 2008/0285138 A1    Nov. 20, 2008

(30) Foreign Application Priority Data

Nov. 18, 2005   (FR)   .................................. 05 11716

(51) Int. Cl.
*G02B 27/14* (2006.01)
*G09G 5/00* (2006.01)
(52) U.S. Cl. ............................. 359/632; 359/630; 345/7

(58) Field of Classification Search .................. 359/630, 359/629, 631, 632; 345/7; 353/11, 12, 13, 353/14
See application file for complete search history.

(56) References Cited

U.S. PATENT DOCUMENTS

| 4,664,475 | A | 5/1987 | Ferrer et al. |
| 5,394,203 | A | 2/1995 | Murphy et al. |
| 5,457,575 | A | 10/1995 | Groves et al. |
| 5,905,477 | A * | 5/1999 | Kuwayama et al. ............. 345/7 |
| 6,930,836 | B2 * | 8/2005 | Harada et al. ................ 359/632 |
| 2002/0167189 | A1 | 11/2002 | Nakamura et al. |
| 2003/0223133 | A1 | 12/2003 | Raines et al. |

OTHER PUBLICATIONS

International Search Report mailed Apr. 11, 2007 in PCT/FR2006/051177.

* cited by examiner

*Primary Examiner*—Jack Dinh
(74) *Attorney, Agent, or Firm*—Nicolas E. Seckel

(57) ABSTRACT

The invention relates to a retractable display device for a motor vehicle comprising a light source (8) for generating a displayable information and a retractable blade (1) for reflecting information towards the vehicle user. Said blade (1) is mounted on a movable support (2) displaceable between a rest position and at least one display position in such a way that said blade (1) is retracted when the movable support (2) is in the rest position and the blade is unfolded when said movable support (2) is in the display position.

18 Claims, 3 Drawing Sheets

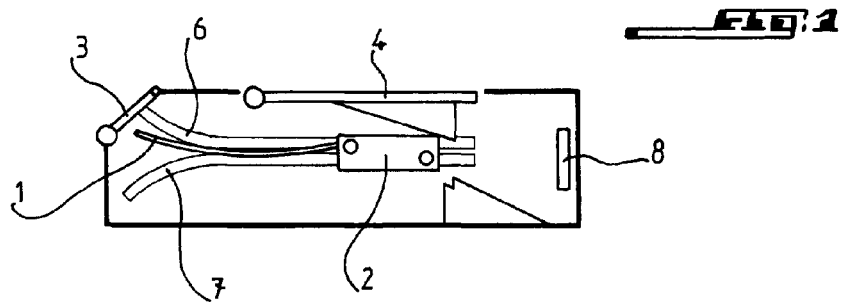
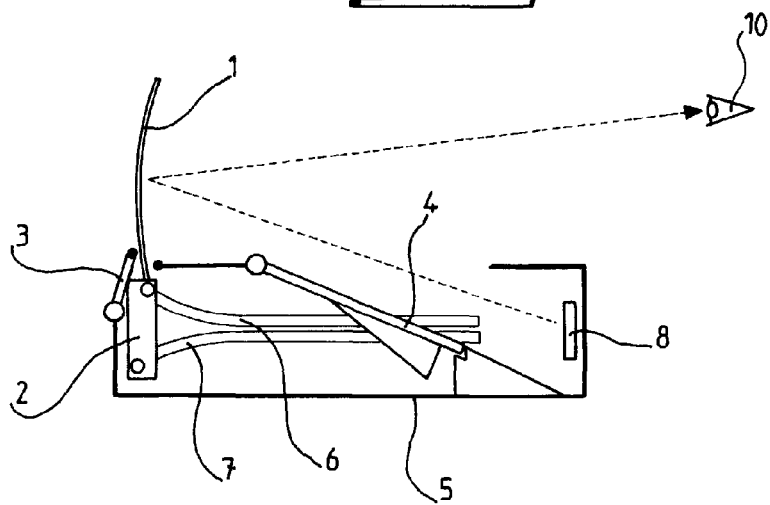
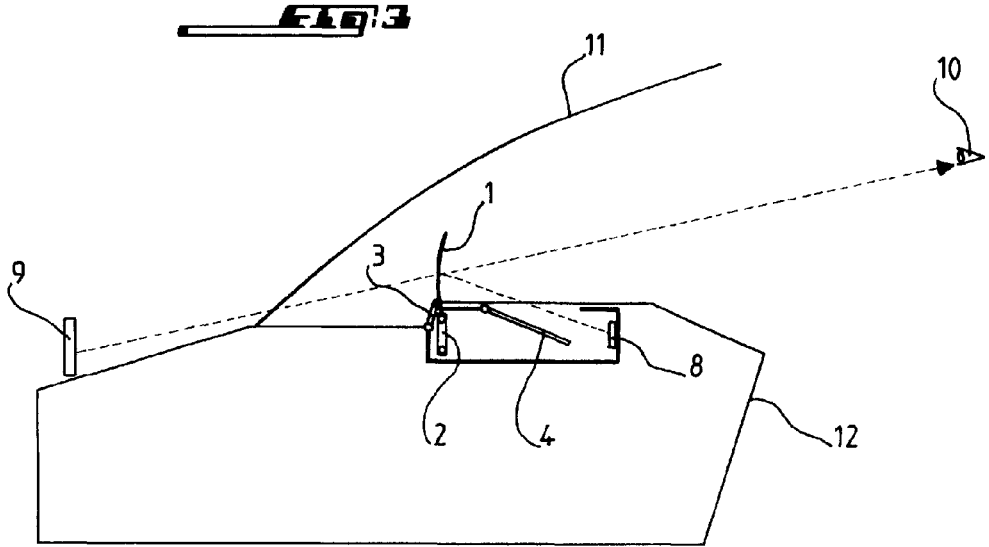

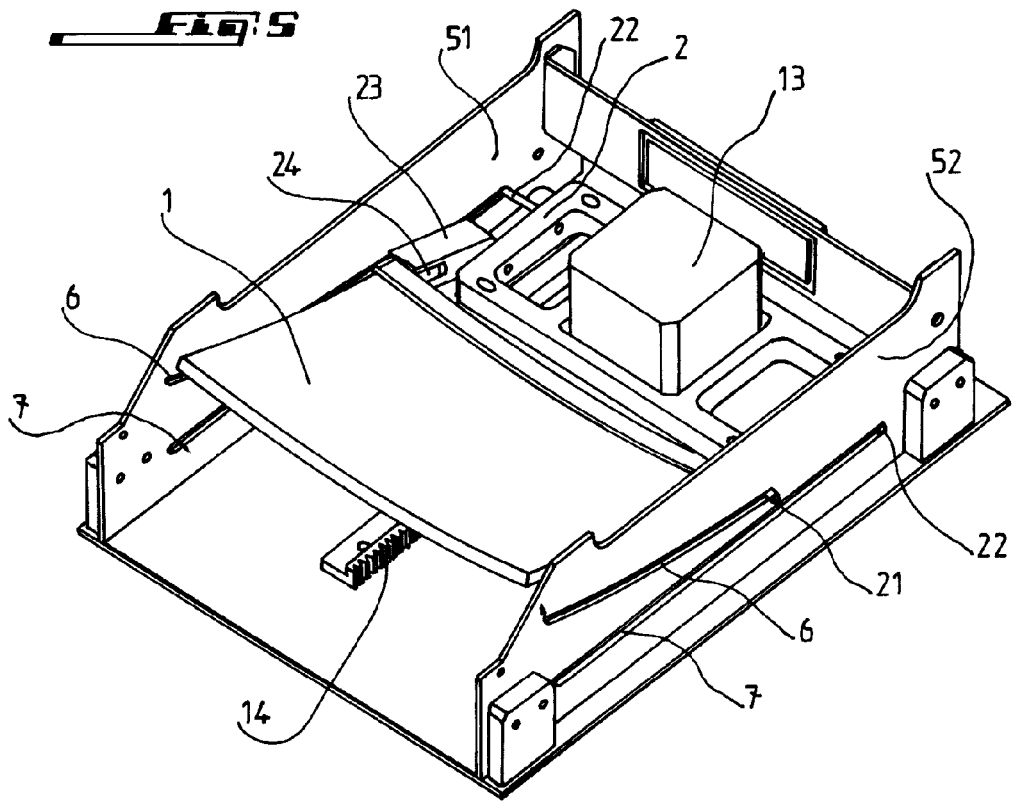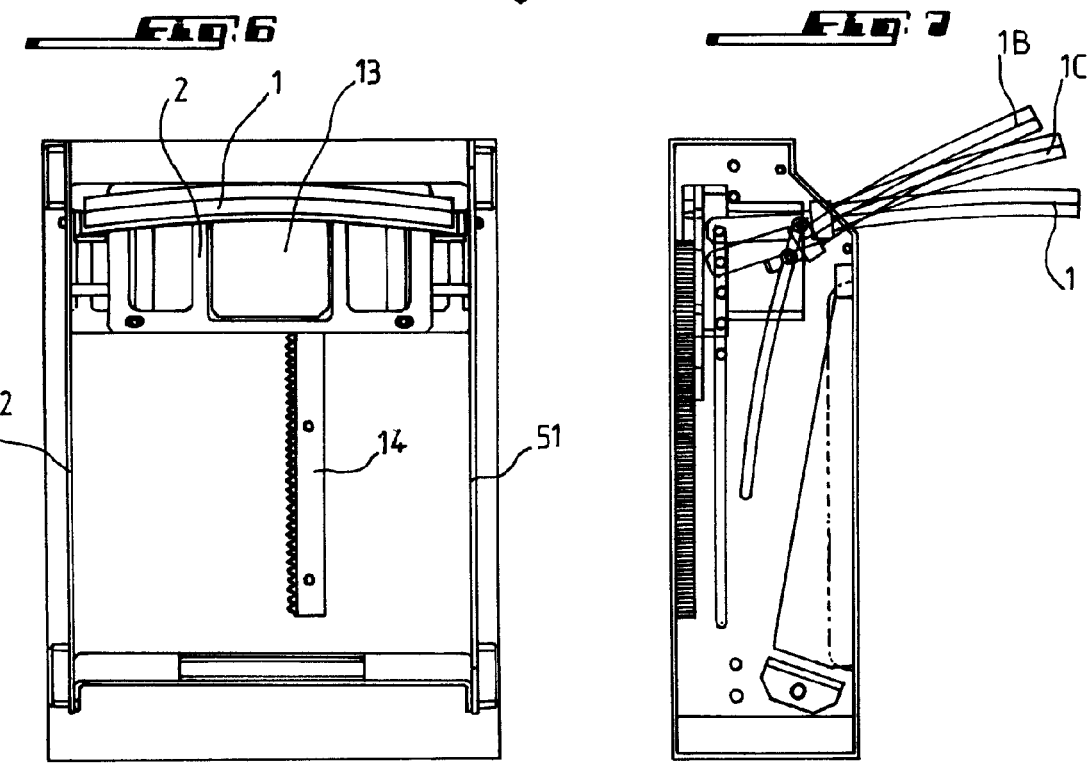

RETRACTABLE DISPLAY DEVICE FOR A MOTOR VEHICLE AND A VEHICLE PROVIDED THEREWITH

The present invention relates to a retractable display device for a motor vehicle, as well as a motor vehicle provided with such a device.

In the interest of improving traffic safety, for a number of years automobile manufacturers have been using display devices incorporating the head-up viewing principle, already in use for some time in aviation.

Head-up viewing display devices make it possible to project an item of information into the visual field in front of the motor vehicle so that the driver of the motor vehicle can read this information without looking away from the space in front of the motor vehicle. At the same time, the information can be read without changing the vehicle driver's visual accommodation.

In order to project information into the visual field in front of the motor vehicle, some display devices use the windshield. Initially, such a device seems advantageous, particularly with respect to the number of components needed. However, the inclination of the windshield or of any other window in a motor vehicle is based on the motor vehicle's aerodynamic or stability/mechanical resistance criteria, and thus does not systematically have an advantageous angle of inclination for positioning the display in the visual field of the driver of the motor vehicle. For this reason, some motor vehicles have been equipped with head-up viewing devices that have an independent reflecting plate.

However, due to the small distances between the driver of the motor vehicle and the plate, size differences between motor vehicle drivers make it so that the virtual images produced by the head-up viewing display device cannot be read with the same ease by all drivers, and are even completely unreadable for some drivers.

At this point, we should note that the present invention relates mainly to a device for displaying information intended for the driver of the motor vehicle. However, the device of the invention can also be designed so that any other user of the motor vehicle who accompanies the driver of the motor vehicle can read this information under the same conditions as those applying to the driver. Likewise, an individual device based on the same criteria can be provided for the user who accompanies the driver of the motor vehicle to display either the same information as for the driver or specific information. Also, in order to simplify the language in the rest of the description of the present invention, reference will be made only to the driver of the motor vehicle.

In addition, positional indications such as "in front", "behind", "above", "below" and others refer to positions as they appear to the driver of the motor vehicle.

Aside from the readability issues posed by display devices with a fixed plate position, it has proven desirable to be able to protect the optical elements of the device, e.g., from dust and other adverse impacts that could impair the quality of the plate.

A first solution consists in mounting the reflecting plate pivotably, in the manner of a lid that is closed when the device is not needed. Such a solution is proposed in document U.S. Pat. No. 5,394,203.

In a display device of this type, the pivoting plate is kept in a protracted position, i.e., in an approximately vertical position, throughout the time that the display device is in use, which generally corresponds to the time that the motor vehicle is in use. When the display device is no longer in use, the plate is retracted by making it pivot about a horizontal axis to bring it to an essentially horizontal or flat position, which is the resting position.

However, just pivoting the plate is not adequate to protect the plate completely, and this also does not protect the hinges or any other pivoting mechanism of the plate.

The purpose of the invention is to remedy the previously listed drawbacks.

At the same time, it is desirable to have the protracted position of the plate—and more particularly, the inclination angle of the plate in protracted position—be adjustable according to the needs of the motor vehicle driver.

The purpose of the invention is achieved with a display device for a motor vehicle comprising a light source intended to generate an item of information to display and a retractable plate that reflects the information toward a user of the vehicle.

According to the invention, the plate is mounted on a mobile support that can be moved between a resting position and at least one display position, so that the plate is retracted when the mobile support is in the resting position and the plate is protracted when the mobile support is in a display position.

With the provisions of the invention, it is possible to make a retractable display device that does not need a large insertion volume in the dashboard of a motor vehicle, and most importantly, does not have a large protective cover requiring a fairly big forward pivot angle in order not to obstruct the optical path of the real image passing through the retractable plate toward the vehicle driver.

The present invention also relates to the characteristics hereinafter, considered individually or in any technically possible combination.

the mobile support is mounted on rails;

the mobile support is mounted on rails designed for pivoting the mobile support between a first, so-called flat position where it is found when in the resting position, and a second, so-called upright position where it is found when it is in a display position;

the plate is fixedly attached onto the mobile support;

the mobile support and the rails are arranged in a housing intended to completely enclose the mobile support and the plate when the plate is retracted;

the housing comprises a flap intended to close off the housing when the plate is retracted;

the light source is housed in the housing;

the housing comprises a hatch that closes off the housing when the plate is retracted and opens the housing far enough when the plate is protracted so that a light beam emitted by the light source can reach the plate;

the device comprises a motorized means that makes it possible to move the mobile support between the resting position and at least one display position;

the motorized means is designed so as to be able to adjust the display position of the mobile support, and thereby adjust the protracted position of the plate so as to make the height at which the information appears appropriate for the height of the user of the motor vehicle.

The purpose of the present invention is also achieved with a motor vehicle comprising a retractable display device having the characteristics listed above.

Other characteristics and advantages of the present invention will be disclosed in the following description of an embodiment of the invention. The description is written with reference to the attached drawings, in which FIG. 1 shows the display device of the invention in the stowed state, in a simplified side view;

FIG. 2 shows the display device of the invention in a protracted state, in a simplified side view;

FIG. 3 shows the layout of the display device of the invention in the front part of a motor vehicle;

FIG. 5 shows the display device of the invention in perspective;

FIG. 6 shows the display device of the invention in a top view; and

FIG. 7 shows the variation in the protracted position of the display device of the invention in a simplified side view.

Figure 4:
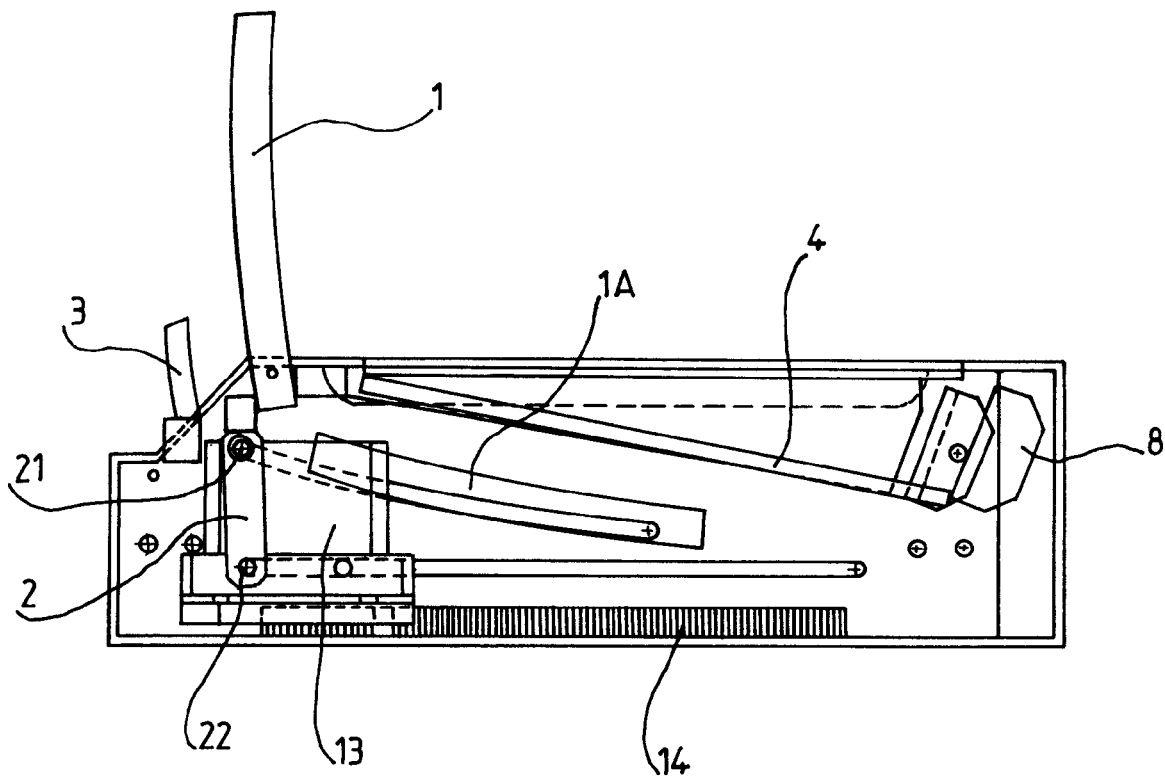
FIG. 4 shows the display device of the invention in a simplified side view, both in stowed position and in a protracted position.

The retractable display device of the invention is shown in FIG. 1 in a stowed state. The device comprises a light source 8 intended to generate an item of information to display and a retractable plate 1 reflecting the information toward a user 10, e.g., the driver of the vehicle. The plate 1 is mounted on a mobile support 2 that can be moved between a resting position near the light source 8 and at least one display position removed from the light source 8. The resting position and the display position(s) are determined so that the plate 1 is retracted—preferably flat—when the mobile support 2 is in the resting position, and so that the plate 1 is protracted—preferably upright—when the mobile support 2 is in a display position.

In order to move the mobile support 2 in either direction between the resting position and at least one display position, and to simultaneously stand the retracted plate 1 upright when going toward a protracted position, or conversely, to lay the plate 1 flat when moving the mobile support 2 from the display position toward the resting position, the mobile support 2 is mounted on rails 6, 7 that guide it both translationally and pivotally.

In order to perform the retraction movement and the protraction movement of the plate 1 solely by controlling the movement of the mobile support 2, the plate 1 is fixedly attached to the mobile support 2.

In accordance with the provisions of the invention, in a protracted position of the independent plate 1, the end-of-travel movement of the mobile support 2 can be adjusted or fine-tuned, e.g., by means of a stepper motor or an endless screw to adjust the inclination angle of the plate 1 and thus the orientation angle of the virtual image 9.

FIG. 2 shows the display device of the invention in display position. This figure shows more particularly that when the completely or at least partially transparent plate 1 is in upright position, the space in front of the motor vehicle is visible through the plate 1. The plate 1 is curved, preferably spherically, so as to enlarge and distance the virtual image 9 that originates from the reflection of the original image emitted by the light source 8.

The display device of the invention additionally comprises a housing 5 with a flap 3 intended to close off the housing 5 when the plate 1 is retracted. The flap 3 opens toward the outside of the housing 5 to make way for the plate 1 when the latter has to come out of the housing 5, and it closes when the plate goes back inside the housing 5. To this end, the flap 3 can be connected to a mechanism by means of which the flap 3 is pushed open and optionally pulled shut as well. However, the flap 3 can also be closed by means of a spring, e.g., a torsion spring that then keeps the flap closed. The flap 3 can also be powered open or closed by an electric motor. The flap 3 can also be pushed open by the plate 1 when it comes out of the housing 5 and be closed again by a spring when the plate goes back in the housing 5.

The housing 5 also comprises a hatch 4 that closes off the housing 5 when the plate 1 is retracted and opens the housing 5 by pivoting toward the inside of the housing 5 when the plate 1 is extended so that a light beam emitted by the light source 8 can reach the plate 1. The hatch 4 can be opened and closed using controlled motorized means or by cooperation between the hatch 4 and means designed for moving the mobile support 2 between the resting position and a display position.

In order to avoid cluttering up FIG. 2, the latter shows only the light beam emitted by the light source 8 and reflected by the plate 1 toward the driver of the motor vehicle, represented by his eyes 10.

FIG. 3 shows the display device of the invention in a protracted state in an application environment, namely a motor vehicle, represented by a windshield 11 and a dashboard 12. In accordance with the operating principle of head-up viewing display devices, an item of information generated by the light source 8 is sent toward the protracted plate 1, which shows it in the form of a virtual image 9 superimposed on the real image of the space in front of the motor vehicle that the driver 10 sees through the windshield 11.

FIG. 4 shows the display device of the invention in a schematic side view with the plate both in a protracted position, referenced 1, and in a flat position, referenced 1A, but with the mobile support 2 in display position only. The flap 3 and the hatch 4 are open.

FIG. 4 also shows that the support 2 is connected to a motorized element 13 cooperating with a rack 14 to move the support 2 in either direction between the resting position and a display position. To make it possible to finely adjust end-of-travel movement into a display position, there are at least two possible solutions. The first consists in using a rack with a fine enough pitch to achieve the desired goal of finely adjusting the display position, and thus the inclination of the plate 1. In an alternative solution, the rack 14 has a rectilinear shape over most of its length and is bent at the end of travel to resolve the displacement movement into a longitudinal component following the rectilinear length of the rack and a transverse component. The actual movement of the mobile support 2 at end of travel in this case depends on the ratio between the longitudinal component and the transverse component. To this end, the rack can be embodied with two straight sections forming an angle between them, or with a rectilinear part followed by a curved part at the end. This alternative solution clearly implies that the motorized element 13 has a transverse freedom of movement with respect to the direction of travel.

A second solution consists in integrating a secondary motorized element, e.g., with an endless screw, into the motorized element 13. In this solution, the motorized element 13 moves the mobile support 2 from the resting position toward a base display position and then the secondary element performs the fine displacement of the mobile support 2.

FIG. 5 shows the display device of the invention in a perspective view. This representation makes it possible to see that the rails 6, 7 are advantageously embodied in the form of grooves in lateral support walls 51, 52 of the housing 5, and that the plate 1 is attached to the mobile support 2 by fitting it into slots 24 in arms 23 of the mobile support 2.

Actually, the mobile support 2 is guided in its movement using pins 21, 22 engaged in the rails 6, 7. The placement and the shape of the rails are chosen so that the mobile support 2 is being laid flat or set upright, respectively, depending on the direction of movement of the support 2, as it is moving. In order to achieve this result, the lower rail 7 is rectilinear and placed essentially horizontally, whereas the upper rail 6 is slightly curved and placed on an angle, in particular becoming more distant from the rail 7 as it approaches the base display position of the mobile support 2. Furthermore, the upper part of the mobile support 2 is guided by the pin 21 engaged in the rail 6 and the lower part is guided by the pin 22 engaged in the rail 7.

FIG. 5 additionally shows that in an alternative embodiment, the lower edge of the plate 1 is not permanently seated in the arms 23, but is disengaged from the slots 24 when the support 2 is in the resting position. This provision essentially makes it possible to prevent any stress from being exerted on the plate 1 by the support 2 while the plate is lying flat. When the mobile support 2 is moved toward a display position, the plate reengages in the slots 24, doing this at the latest when the plate 1 is upright enough for the weight of the plate to have an effect.

FIG. 6 shows the display device of the invention in a top view, more particularly showing the arrangement of the plate 1 and the support 2, as well as the motorized element 13 and the rack 14 between the lateral support walls 51, 52 of the housing 5.

FIG. 7 shows the display device of the invention in a side view with the plate 1 at three different inclinations corresponding to end-of-travel positions when the support 2 is moving toward a display position. The references 1B and 1C respectively indicate a second-to-last position and a last position of the plate before its final position, referenced 1.

FIG. 7 also shows the final position and a last position before the final position of the support 2.

The invention claimed is:

1. Display device for a motor vehicle, comprising a light source intended to generate an item of information to display and an at least partially transparent retractable plate that reflects the information toward a user of the vehicle,
   wherein the plate is mounted on a mobile support that is movable between a resting position and at least one display position, so that the plate is in a retracted position when the mobile support is in the resting position and the plate is in a protracted position when the mobile support is in the at least one display position,
   wherein the mobile support is mounted on rails, wherein the rails (i) guide the mobile support in translation between the resting position and the at least one display position, and (ii) pivot the mobile support between the resting position and the at least one display position, so that the plate is translated and pivoted between its retracted position and its protracted position.

2. Device according to claim 1, wherein the plate is fixedly attached onto the mobile support.

3. Device according to claim 2, wherein the mobile support and the rails are arranged in a housing intended to completely enclose the mobile support and the plate when the plate is retracted.

4. Device according to claim 3, wherein the housing comprises a flap intended to close off the housing when the plate is retracted.

5. Device according to claim 3, wherein the light source is housed in the housing and in that the housing comprises a hatch that closes off the housing when the plate is retracted and opens the housing far enough when the plate is protracted so that a light beam emitted by the light source can reach the plate.

6. Device according to claim 2, which comprises a motorized means that makes it possible to move the mobile support between the resting position and at least one display position.

7. Device according to claim 6, wherein the motorized means is designed so as to be able to adjust the display position of the mobile support, and thereby adjust the protracted position of the plate, so as to make the height at which the information appears appropriate for the height of the user of the motor vehicle.

8. Motor vehicle characterized in that it comprises a device according to claim 2.

9. Device according to claim 1, wherein the mobile support and the rails are arranged in a housing intended to completely enclose the mobile support and the plate when the plate is retracted.

10. Device according to claim 9, wherein the housing comprises a flap intended to close off the housing when the plate is retracted.

11. Device according to claim 9, wherein the light source is housed in the housing and in that the housing comprises a hatch that closes off the housing when the plate is retracted and opens the housing far enough when the plate is protracted so that a light beam emitted by the light source can reach the plate.

12. Device according to claim 1, which comprises a motorized means that makes it possible to move the mobile support between the resting position and at least one display position.

13. Device according to claim 12, wherein the motorized means is designed so as to be able to adjust the display position of the mobile support, and thereby adjust the protracted position of the plate, so as to make the height at which the information appears appropriate for the height of the user of the motor vehicle.

14. Motor vehicle characterized in that it comprises a device according to claim 1.

15. Device according to claim 1, wherein the mobile support is guided by two rails on each of its lateral sides, wherein the two rails of each side become more distant from each other toward the display position.

16. Device according to claim 1, wherein a first of the two rails of each side is essentially rectilinear whereas a second of the two rails is at least one of (i) curved and (ii) placed at an angle with respect to the first rail.

17. Device according to claim 1, wherein the rails are formed as grooves in lateral support walls, and the mobile support is guided by pins engaged in the rails.

18. Device according to claim 1, wherein the plate is disengaged from the mobile support when the mobile support is in the resting position.

* * * * *